(12) United States Patent
Stryker et al.

(10) Patent No.: US 8,095,684 B2
(45) Date of Patent: Jan. 10, 2012

(54) INTELLIGENT DEVICE AND MEDIA SERVER SELECTION FOR OPTIMIZED BACKUP IMAGE DUPLICATION

(75) Inventors: Donald J. Stryker, Saint Paul, MN (US); Claudia L. Rudolph, Medina, MN (US); Rakesh Didwania, New Brighton, MN (US); Shanthi Paladugu, Maple Grove, MN (US)

(73) Assignee: Symantec Corporation, Mountain View, CA (US)

( * ) Notice: Subject to any disclaimer, the term of this patent is extended or adjusted under 35 U.S.C. 154(b) by 99 days.

(21) Appl. No.: 12/559,560

(22) Filed: Sep. 15, 2009

(65) Prior Publication Data

US 2011/0066754 A1 Mar. 17, 2011

(51) Int. Cl.
*G06F 15/173* (2006.01)
(52) U.S. Cl. ........................................ 709/241; 709/226
(58) Field of Classification Search .......... 709/223–248, 709/203–205, 217–219
See application file for complete search history.

(56) References Cited

U.S. PATENT DOCUMENTS

| | | | |
|---|---|---|---|
| 5,521,910 A | 5/1996 | Matthews | |
| 5,596,719 A | 1/1997 | Ramakrishnan et al. | |
| 5,600,638 A | 2/1997 | Bertin et al. | |
| 5,633,999 A * | 5/1997 | Clowes et al. | 714/6.21 |
| 6,363,319 B1 | 3/2002 | Hsu | |
| 6,377,551 B1 | 4/2002 | Luo et al. | |
| 6,601,187 B1 | 7/2003 | Sicola et al. | |
| 6,658,540 B1 | 12/2003 | Sicola et al. | |
| 6,762,997 B1 | 7/2004 | Liu et al. | |
| 6,944,152 B1 | 9/2005 | Heil | |
| 6,947,981 B2 | 9/2005 | Lubbers et al. | |
| 6,950,871 B1 | 9/2005 | Honma et al. | |
| 7,342,890 B1 * | 3/2008 | Ferguson | 370/238 |
| 7,343,410 B2 | 3/2008 | Mercier et al. | |
| 7,606,176 B2 * | 10/2009 | Joshi et al. | 370/255 |
| 2001/0034795 A1 | 10/2001 | Moulton et al. | |
| 2005/0053007 A1 * | 3/2005 | Bernhardt et al. | 370/238 |
| 2005/0091396 A1 | 4/2005 | Nilakantan et al. | |
| 2005/0202391 A1 * | 9/2005 | Allen et al. | 434/362 |

(Continued)

OTHER PUBLICATIONS

Henry Lin, J.H. Abawajy, Rajkumar Buyya; "Economy-Based Data Replication Broker"; 2006; 8 pages; <http://www.gridbus.org/papers/Data_Rep_Broker_e-Science2006.pdf>.

(Continued)

*Primary Examiner* — Asad Nawaz
(74) *Attorney, Agent, or Firm* — Meyertons Hood Kivlin Kowert & Goetzel, P.C.; Jeffrey C. Hood

(57) ABSTRACT

Systems, methods, and computer-readable storage media are disclosed for a computer system determining a transport path for a data duplication job. A data duplication job request, being a request that data stored on a source device be duplicated, may be received. A plurality of possible transport path components may be enumerated. The plurality of possible transport path components may include one or more possible destination devices, one or more possible means of transport, and one or more possible media servers. A ranking may be determined for at least a subset of the possible transport path components. An availability may be determined for at least a subset of the possible transport path components. A transport path may be selected based on the determined rankings and the determined availabilities. The data duplication job may be performed using the selected transport path.

19 Claims, 6 Drawing Sheets

U.S. PATENT DOCUMENTS

| | | | | |
|---|---|---|---|---|
| 2006/0007882 | A1* | 1/2006 | Zeng et al. | 370/328 |
| 2007/0220072 | A1* | 9/2007 | Enbutsu et al. | 707/204 |
| 2007/0266061 | A1* | 11/2007 | Fujiyama et al. | 707/204 |
| 2010/0070764 | A1* | 3/2010 | Ishii et al. | 713/168 |
| 2010/0124196 | A1* | 5/2010 | Bonar et al. | 370/329 |
| 2010/0333116 | A1* | 12/2010 | Prahlad et al. | 719/328 |

OTHER PUBLICATIONS

Tao Wu, David Starobinski; Abstract of "A Comparative Analysis of Server Selection in Content Replication Networks"; IEEE/ACM Transactions on Networking (TON), vol. 16, Issue 6, Dec. 2008; 6 pages; <http://portal.acm.org/citation.cfm?id=1514034#abstract>.

David Starobinski, Tao Wu; Abstract of "Performance of Server Selection Algorithms for Content Replication Networks"; 2005; 2 pages; <http://www.springerlink.com/content/ymlc6nc00j1dceg2/.

Tan Zhipeng, Feng Dan; Abstract of "Dynamic Replication Strategies for Object Storage Systems"; 2006; 2 pages; <http://www.springerlink.com/content/4748166wn8206188/>.

Hai Huang, Wanda Hung, Kang G. Shin; "FS2: Dynamic Data Replication in Free Disk Space for Improving Disk Performance and Energy Consumption"; SOSP'05, Oct. 23-26, 2005; Brighton, United Kingdom; 14 pages; <http://www.cs.fsu.edu/~awang/courses/cis6935_s2007/fs2.pdf>.

* cited by examiner

US 8,095,684 B2

INTELLIGENT DEVICE AND MEDIA SERVER SELECTION FOR OPTIMIZED BACKUP IMAGE DUPLICATION

BACKGROUND

1. Technical Field

This disclosure relates generally to data duplication, and, more specifically, to optimizing device and media server selection for backup image duplication.

2. Description of the Related Art

Duplication is an important part of enterprise backup systems. An enterprise may employ duplication to improve redundancy for important backup images and for supporting disaster recovery scenarios.

In an enterprise backup environment, data can reside on disk or tape repositories, each of which may be accessible from one or more servers on a network. Tape drives typically reside within tape libraries, which are often storage area network (SAN) connected peripherals in environments where there can be thousands of servers and many storage devices. Media servers typically manage tape libraries and provide access to tape units and disk repositories. Connectivity within the enterprise backup environment can be provided by multiple networks, including different types of networks. All in all, an enterprise backup environment may be a large and complex system.

A duplication request asks that a source data image be copied to a destination data repository. Because of the typical size and complexity of an enterprise backup environment, the nature of the I/O path between the source and destination may be very important to the efficiency of the duplication process. Conventionally, this demands that an administrator be cognizant of loads that will be running on each server in their system at any given time and schedule duplication of data to distribute the load across devices and media servers, which may be a significant burden on the administrator. Accordingly, improvements in the field would be desirable.

SUMMARY

Embodiments are presented of a system and method for automatically selecting a transport path for a data duplication job.

One set of embodiments includes a computer readable storage medium. The computer readable storage medium may include program instructions for selecting a transport path for a data duplication job. The program instructions may be executable by a computer system to receive a data duplication job request. The data duplication job request may be a request that data stored on a source device be duplicated. The program instructions may be further executable to enumerate a plurality of possible transport path components. The plurality of possible transport path components may include one or more possible destination devices, one or more possible means of transport, and one or more possible media servers. The program instructions may be further executable to determine a ranking for at least a subset of the possible transport path components. The program instructions may also be executable to determine an availability for at least a subset of the possible transport path components. Based on the determined rankings and the determined availabilities, the program instructions may be executable to select a transport path. The data duplication job may be performed using the selected transport path.

According to some embodiments, the program instructions to select the transport path may be executable to determine that a highest ranked means of transport is available, and select a first transport path that utilizes the highest ranked means of transport based on the determination that the highest ranked means of transport is available.

According to some embodiments, the program instructions to select the transport path may be executable to determine that the highest ranked means of transport is not available, and to determine, based on characteristics of the data duplication job and runtime characteristics of the possible transport path components, whether to put the data duplication job into a queue or to select a second transport path.

According to some embodiments, the program instructions to select the transport path may be executable to determine that the highest ranked means of transport is not available, and select a second transport path in response to determining that the highest ranked means of transport is not available. The second transport path may utilize a highest ranked available means of transport.

According to some embodiments, the program instructions to select the transport path may be executable to determine that the highest ranked means of transport is not available, and place the data duplication job into a queue in response to determining that the highest ranked means of transport is not available. The program instructions may be further executable to periodically check whether the highest ranked means of transport is available. If the periodic checking indicates that the highest ranked means of transport is available, the program instructions may be executable to select a first transport path that utilizes the highest ranked means of transport. If the highest ranked means of transport is not available after a preconfigured amount of time has passed, the program instructions may be executable to select a second transport path that utilizes a highest ranked available means of transport.

According to some embodiments, the selected transport path may include a selected destination device, a selected means of transport, and a selected one or more media servers. The first destination device may be coupled to the source device by the first means of transport and the first one or more media servers.

According to some embodiments, the ranking for each respective possible transport path component may be based on the runtime loading and performance capability of the respective possible transport path component.

According to some embodiments, the possible means of transport may include one or more of shared memory transport, device direct copy transport, fibre channel transport, LAN transport or WAN transport.

One set of embodiments includes a method for selecting a transport path for a data duplication job. The method may include using a computer to perform the following steps. A data duplication job request may be received. The data duplication job request may include a request that data stored on a source device be duplicated. A plurality of possible transport path components may be enumerated. The plurality of possible transport path components may include one or more possible destination devices, one or more possible means of transport, and one or more possible media servers. A ranking for at least a subset of the possible transport path components may automatically be determined. An availability for at least a subset of the possible transport path components may automatically be determined. A transport path may automatically be selected based on the determined rankings and the determined availabilities. The data duplication job may be performed using the selected transport path.

According to some embodiments, automatically selecting the transport path may be based on whether the highest ranked means of transport is available. If the highest ranked means of transport is available, a first transport path that utilizes the highest ranked means of transport may be automatically selected. If the highest ranked means of transport is not available, a decision may be made whether to put the data duplication job into a queue or to select a second transport path. The decision may be made based on characteristics of the data duplication job and runtime characteristics of the possible transport path components. If it is decided to select the second transport path, then the second transport path may be automatically selected. The second transport path may utilize a highest ranked available means of transport.

According to some embodiments, if it is decided to put the data duplication job into the queue, then the data duplication job may be put into the queue. Periodic checks may be made as to whether highest ranked means of transport is available. If one of the periodic checks indicates that the highest ranked means of transport is available, a third transport path may be automatically selected. The third transport path may utilize the highest ranked means of transport. If the highest ranked means of transport is not available after a preconfigured amount of time has passed, a fourth transport path may be automatically selected. The fourth transport path may utilize a highest ranked available means of transport.

According to some embodiments, the selected transport path may include a selected destination device, a selected means of transport, and a selected one or more media servers. The first destination device may be coupled to the source device by the first means of transport and the first one or more media servers.

According to some embodiments, the ranking for each respective possible transport path component may be based on the runtime loading and performance capability of the respective possible transport path component.

According to some embodiments, the possible means of transport may include one or more of shared memory transport, device direct copy transport, fibre channel transport, LAN transport or WAN transport.

One set of embodiments includes a computer system, which may include one or more processors, and a computer-readable storage medium coupled to the one or more processors. The computer-readable storage medium may include program instructions for selecting a transport path for a data duplication job. The program instructions may be executable by the one or more processors to implement the following steps. A data duplication job request may be received. The data duplication job request may include a request that data stored on a source device be duplicated. A plurality of possible transport path components may be enumerated. The plurality of possible transport path components may include one or more possible destination devices, one or more possible means of transport, and one or more possible media servers. A ranking for at least a subset of the possible transport path components may be determined. An availability for at least a subset of the possible transport path components may be determined. A transport path may be selected based on the determined rankings and the determined availabilities. The data duplication job may be performed using the selected transport path.

According to some embodiments, selecting the transport path may be based on whether the highest ranked means of transport is available. If the highest ranked means of transport is available, a first transport path that utilizes the highest ranked means of transport may be selected. If the highest ranked means of transport is not available, a decision may be made whether to put the data duplication job into a queue or to select a second transport path. The decision may be made based on characteristics of the data duplication job and runtime characteristics of the possible transport path components. If it is decided to select the second transport path, then the second transport path may be selected. The second transport path may utilize a highest ranked available means of transport.

According to some embodiments, if it is decided to put the data duplication job into the queue, then the data duplication job may be put into the queue. Periodic checks may be made as to whether highest ranked means of transport is available. If one of the periodic checks indicates that the highest ranked means of transport is available, a third transport path may be selected. The third transport path may utilize the highest ranked means of transport. If the highest ranked means of transport is not available after a preconfigured amount of time has passed, a fourth transport path may be selected. The fourth transport path may utilize a highest ranked available means of transport.

According to some embodiments, the selected transport path may include a selected destination device, a selected means of transport, and a selected one or more media servers. The first destination device may be coupled to the source device by the first means of transport and the first one or more media servers.

According to some embodiments, the ranking for each respective possible transport path component may be based on the runtime loading and performance capability of the respective possible transport path component.

According to some embodiments, the possible means of transport may include one or more of shared memory transport, device direct copy transport, fibre channel transport, LAN transport or WAN transport.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Client system." This term has its ordinary and accepted meaning in the art, which includes a computer system that requests services, data, etc. from a server system.

"Database." This term has its ordinary and accepted meaning in the art, which includes a collection of records or data stored on a computer system.

Figure 1:
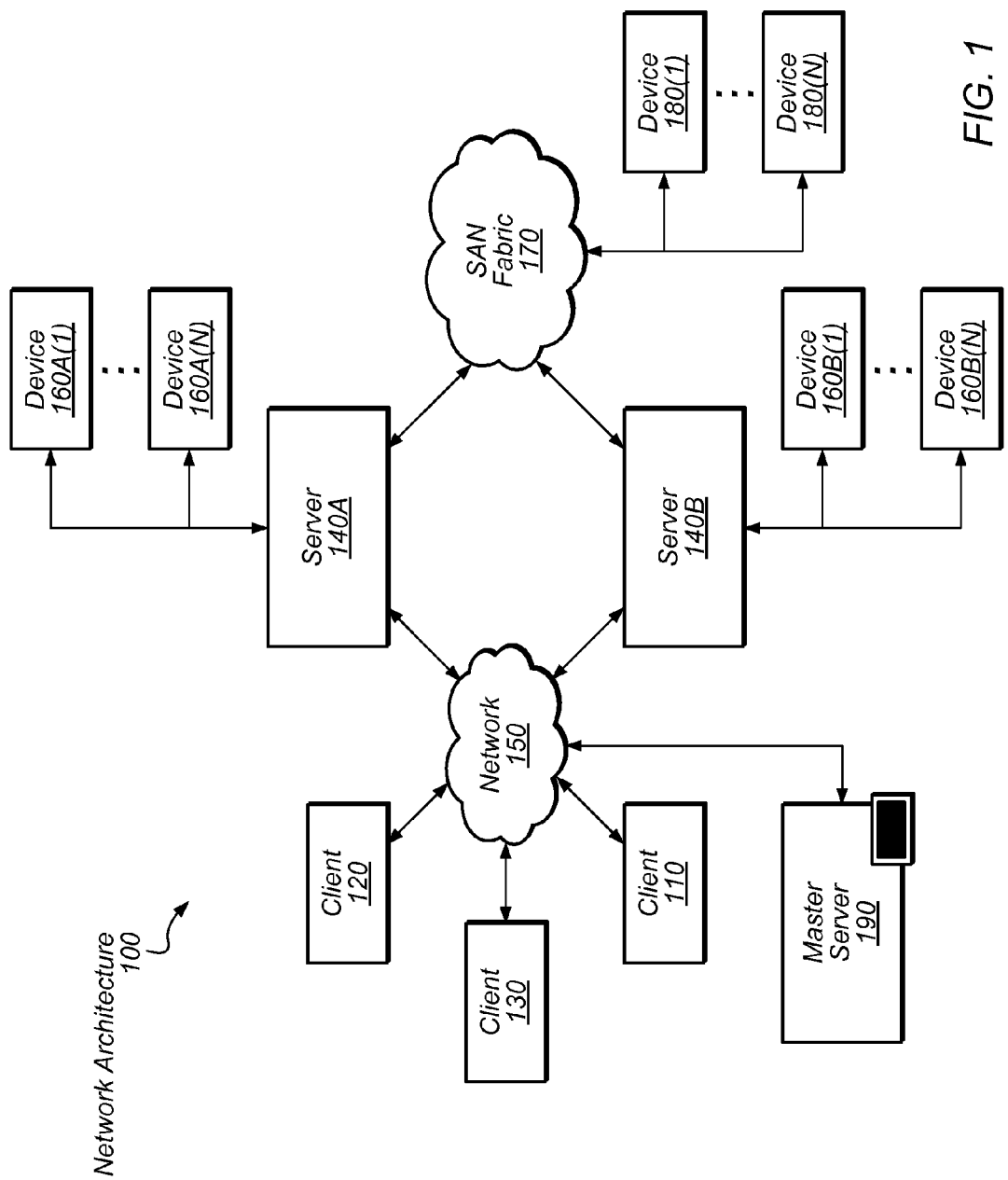
FIG. 1 is a block diagram illustrating a network architecture according to one embodiment.
Figure 2:
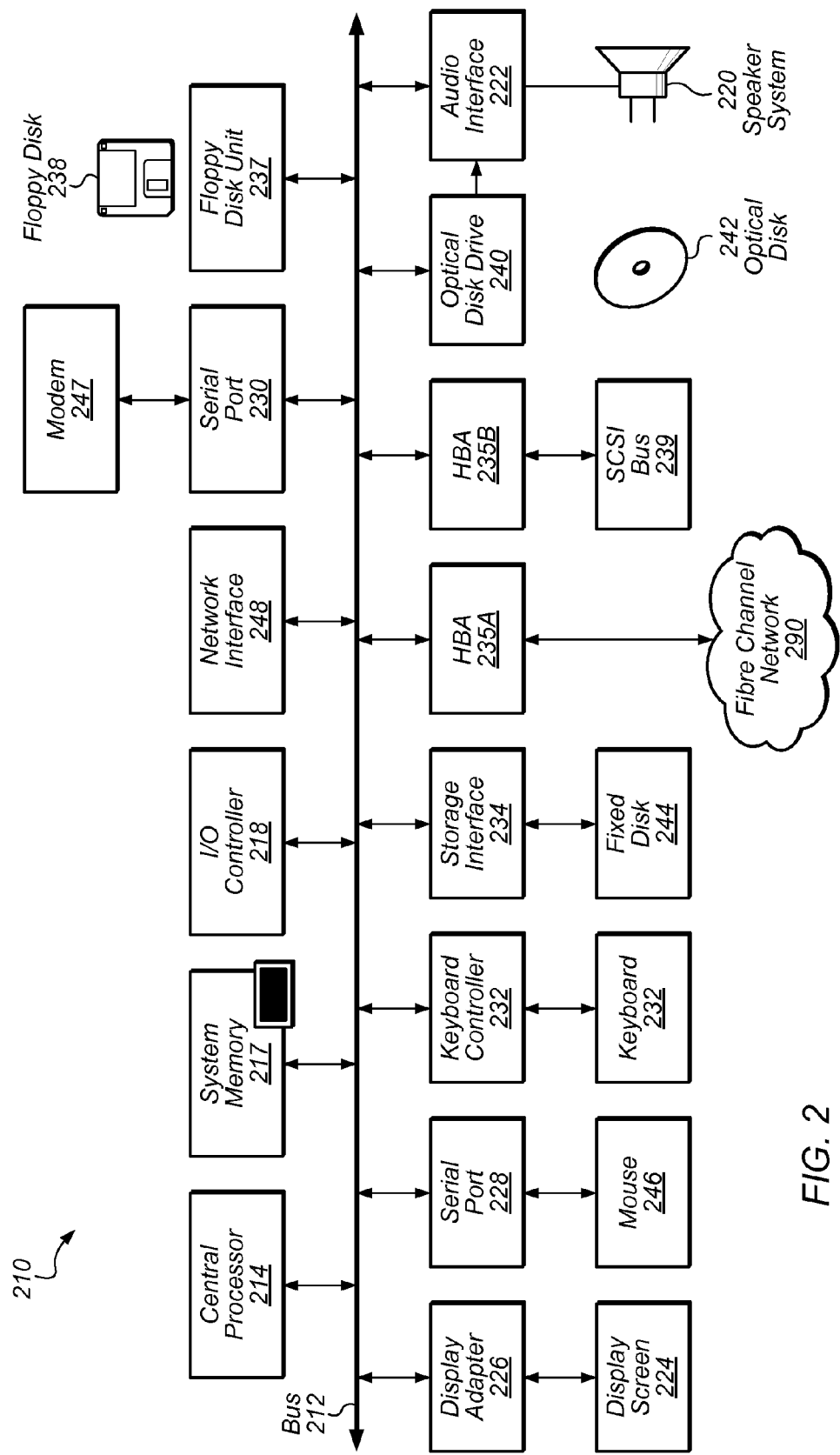
FIG. 2 is a block diagram illustrating a computer system according to one embodiment.

FIG. 1 is a block diagram depicting a network architecture 100 in which client systems 110, 120 and 130, as well as storage servers 140A and 140B and master server 190 (any of which can be implemented using computer system 210, shown in FIG. 2), are coupled to a network 150. Storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N). Additionally, a user may be able to request that certain tasks be performed using a client system 110, 120, or 130. For example, in one embodiment, a user may desire that a data image be copied (e.g., backed up) to a storage device, or that the data image (e.g., the backup image) be duplicated from the storage device to another storage device, e.g., for redundancy. The user may be able to create such data backup or data duplication job requests using a client system 110, 120, or 130. The data duplication job request may be sent to the master server 190, which may determine a transport path for the data duplication job according to an embodiment described herein. Alternatively, a user could create such backup or data duplication requests on the master server 190, either directly (e.g., through a user console at the master server 190) or remotely (e.g., through one of the client systems 110, 120, or 130). FIG. 1 depicts the use of a network such as the Internet for exchanging data, but the present disclosure is not limited to the Internet or any particular network-based environment.

As indicated by the black box, according to some embodiments master server 190 may be configured to implement the present disclosure. The master server 190 may be a server specifically configured to manage network traffic and tasks, e.g., an administrative server. Alternatively, in some embodiments the master server 190 may be any kind of general purpose computer system configured to implement the present disclosure, and need not be a special type of server. Additionally, although the master server 190 is shown as being connected through network 150, it will be noted that the computer system implementing the present disclosure may be connected in any of various ways. For example, in some embodiments, the part or all of the present disclosure could be implemented as part of a cloud computing environment.

FIG. 2 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., tape drives, tape libraries, disk arrays, document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
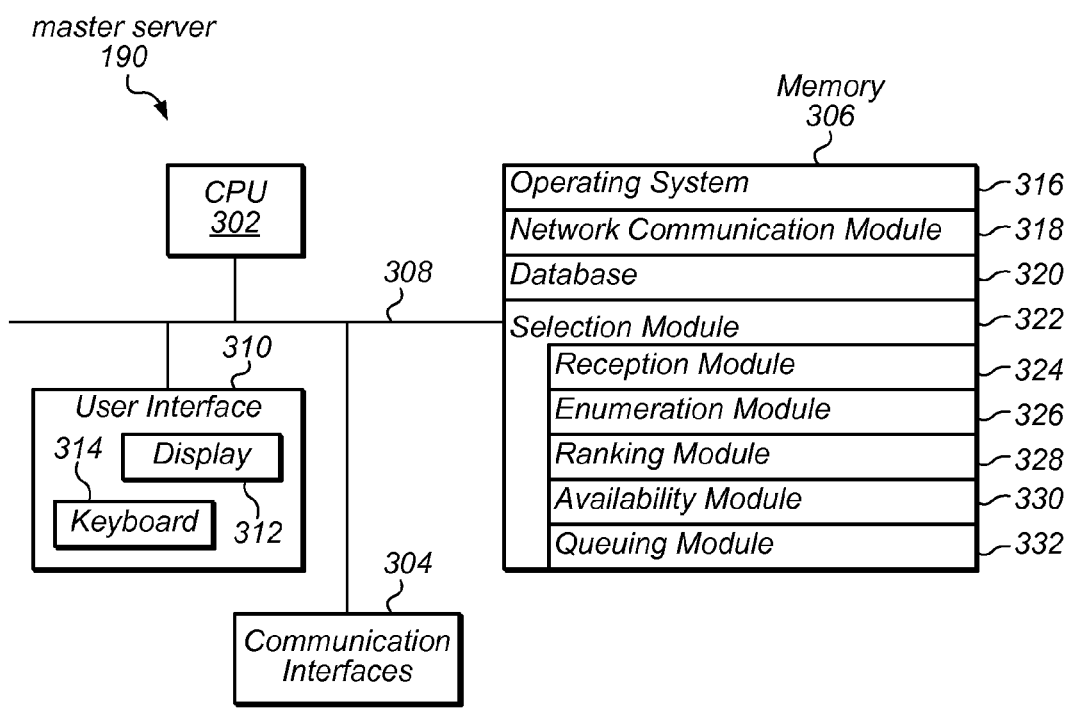
FIG. 3 is a block diagram illustrating one embodiment of a representative computer system configured to automatically select a transport path for a data duplication job.

FIG. 3 is a block diagram illustrating one embodiment of a computer system implementing the present disclosure, such as master server 190 shown in FIG. 1. Although FIG. 3 represents one embodiment, it will be recognized that any number of variations thereof are also possible.

The master server 190 typically includes one or more processing units (CPUs) 302, one or more network or other communications interfaces 304, memory 306, and one or more communication buses 308 for interconnecting these components. The master server 190 may optionally include a user interface 310, including a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

an operating system 316 that includes procedures for handling various basic system services and for performing hardware dependent tasks;

a network communication module (or instructions) 318 that is used for connecting the master server 190 to other computers via the one or more communications interfaces 304 (wired or wireless), such as the Internet, other wide area networks, local area networks, metropolitan area networks, and so on;

a database 320 for storing information about network topology, runtime states, loading factors, and/or other information; and a selection module (or instructions) 322 for selecting a transport path for a data duplication job.

The database 320, which may include information about network topology, runtime states, loading factors, and/or other information, may be periodically updated to reflect new information on the state of the networked environment. For example, in some embodiments, the database may be updated by daemon software that asynchronously updates the topology information, the runtime states, and/or the loading factors for various components of the networked environment. The database may alternatively or additionally be updated in any number of other ways, as desired.

In some embodiments, the selection module 322 may include the following elements, or a subset or superset of such elements:

a reception module (or instructions) 324 for receiving data duplication job requests;

an enumeration module (or instructions) 326 for enumerating a plurality of possible transport path components;

a ranking module (or instructions) 328 for determining rankings for possible transport path components;

an availability module (or instructions) 330 for determining the availability of the possible transport path components; and a queuing module (or instructions) 332 for determining if the data duplication job should be put into a queue.

It should be noted that in various embodiments, some or all of the modules above may be combined together or separated into further modules.

Figure 4:
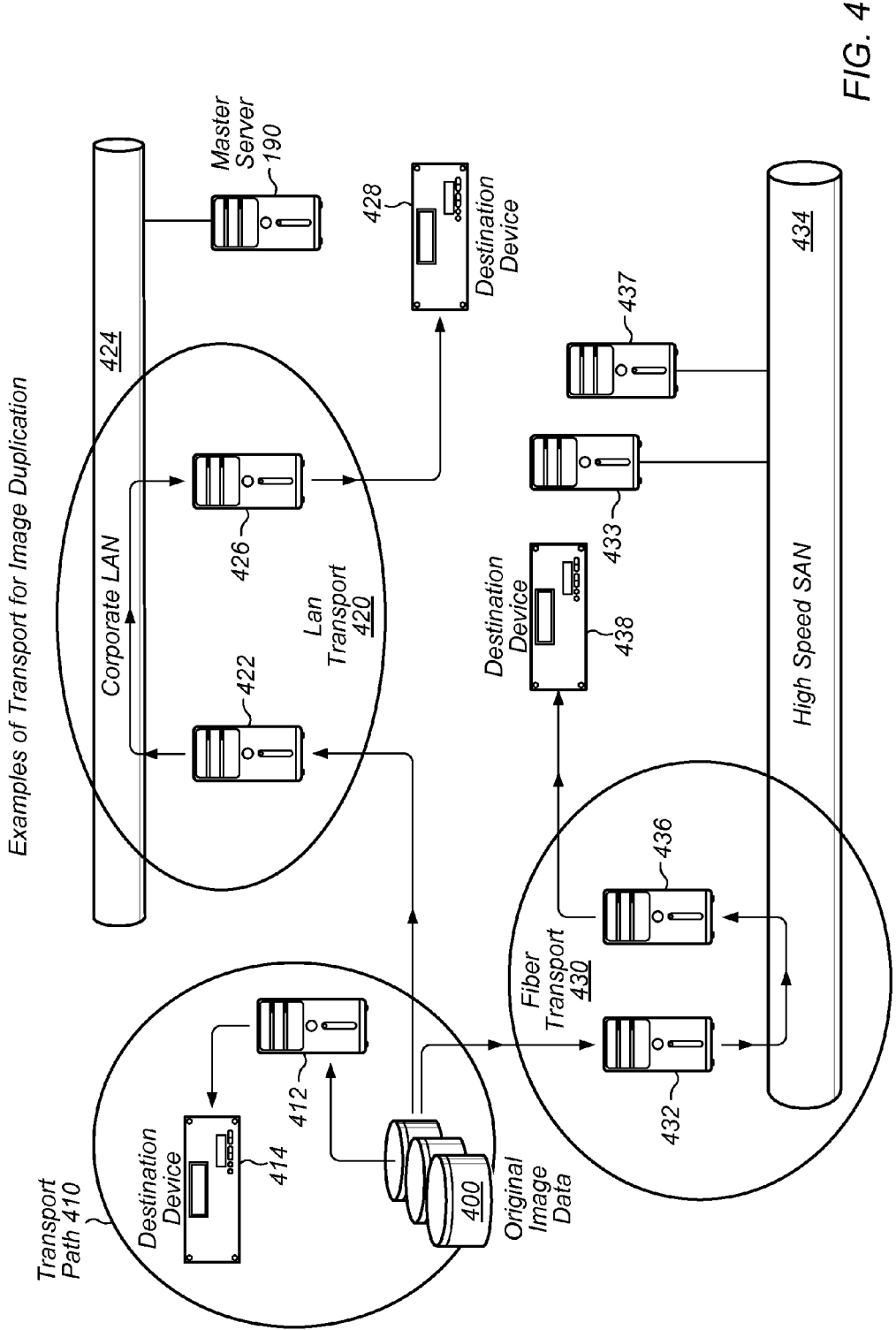
FIG. 4 is a block diagram illustrating possible transport paths for a data duplication job.

Referring now to FIG. 4, an exemplary embodiment of an enterprise backup environment (e.g., a data center), including various possible transport paths for a data duplication job, is shown. As shown, there may be various networks (potentially including different types of networks, such as Ethernet, Fibre-Channel, and/or other types of networks), media servers, and storage devices, as well as a master server for coordinating system traffic and operations. While FIG. 4 represents one possible embodiment of such an enterprise backup environment, it should be noted that any number of variations are possible, including networks of various sizes and topologies, ranging from networks with just a few components, to those with hundreds, thousands, or even more media servers, storage devices, and/or other components.

The larger a backup environment is, and the more complex the connectivity between components of the backup environment is, the more important may be the I/O path between a data source and a destination for the data. In order to avoid wasting network resources, it is desirable that such paths be as efficient as possible, especially in a busy, high-traffic networked environment. Some types of transport paths may be more efficient than others, depending, e.g., on the various components that make up the transport path. For example, each transport path may include a destination device (e.g., a disk drive, a tape drive, or another storage device) to which the data image may be copied, as well as a means of transport, and one or more media servers. The inherent capabilities of the various components, the length of (e.g., the number of components along) the transport path, and the loading of the various components, among other factors, will all affect the efficiency (e.g., the time of transport and the quantity of network resources required) of a transport path.

FIG. 4 shows three possible transport paths, each utilizing a different means of transport, for a data image 400 which is to be duplicated. In transport path 410, the destination device 414 and the source device (e.g., the storage device on which the data image 400 to be duplicated is located) are both directly connected to a single media server 412. This means of transport is referred to herein as "shared memory transport". Transport path 420, in contrast, involves moving the data 400 from the source device through a first media server 422, across a LAN 424 to a second media server 426, and from there to destination device 428. Transport path 430 is similar to transport path 420, in that it includes transporting the data image across multiple media servers 432 and 436 and through a network, although transport path 430 utilizes high-speed Storage Area Network (SAN) 434, e.g., a fibre-channel network, rather than a LAN such as LAN 424.

As shown, transport paths 410, 420, and 430 each utilize a different means of transport, e.g., transport path 410 uses shared memory transport (e.g., a server directly connected to both the source device and the destination device), while transport path 420 uses LAN transport, and transport path 430 uses fibre-channel transport. Different means of transport are also possible in addition to or instead of these; for example, in some embodiments, a device-direct copy, e.g., using a deduping device to directly copy image data from its source device to a destination, may be another possible means of transport; other means' of transport are also envisioned.

According to some embodiments, means of transport may be an important component in determining the desirability (e.g., the efficiency) of a transport path. For example, according to one embodiment, due to the relative means' of transport of the transport paths shown in FIG. 4, transport path 410 may be the most desirable, followed by transport path 420, with transport path 430 being the least desirable transport path of those shown in FIG. 4. That is to say, according to some embodiments, of the three means' of transport shown in FIG. 4, shared memory transport may be considered the most efficient, followed by fibre-channel transport, followed by LAN transport. In other embodiments, different means' of transport (or combinations of means' of transport) may be considered differently, e.g., given different efficiency conditions or requirements, as will be apparent to one of skill in the art in light of this disclosure.

In addition, in some embodiments, other factors in addition to the means of transport, such as runtime states and loading factors of components, may also be considered in determining the desirability (e.g., the efficiency) of a transport path. While FIG. 4 shows only one transport path corresponding to each means of transport, in a large, networked environment, it may be common that multiple transport paths are possible using each of one or more of the possible means of transport. For example, media server 433 and/or media server 437 might also connect to destination device 438 and/or one or more other destination devices, and/or might connect to one or both of media servers 432 or 436, and/or the source device, and thus might present one or more additional transport paths that utilize SAN 434, in some embodiments. Among possible transport paths that use a particular means of transport, various of the possible components may be lightly or heavily loaded with traffic and may have varying capacities (e.g., number and speed of processors, connection bandwidth, etc.), and/or there may be other factors that affect how efficient the performance of an actual data duplication job along a given transport path would be. If multiple transport paths are possible using a particular means of transport, such factors may influence which transport path would provide the best actual performance. In some embodiments, these factors may be sufficiently important as to cause a topologically less-efficient transport path (e.g., one which utilizes fibre-channel transport instead of shared memory transport) to have better performance than a topologically more-efficient transport path in practice.

Embodiments of the system and method disclosed herein may operate to select a transport path for data duplication in a networked backup environment such as the one shown in FIG. 4. Such a system and method is further described below with reference to FIGS. 5 and 6.

Figure 5:
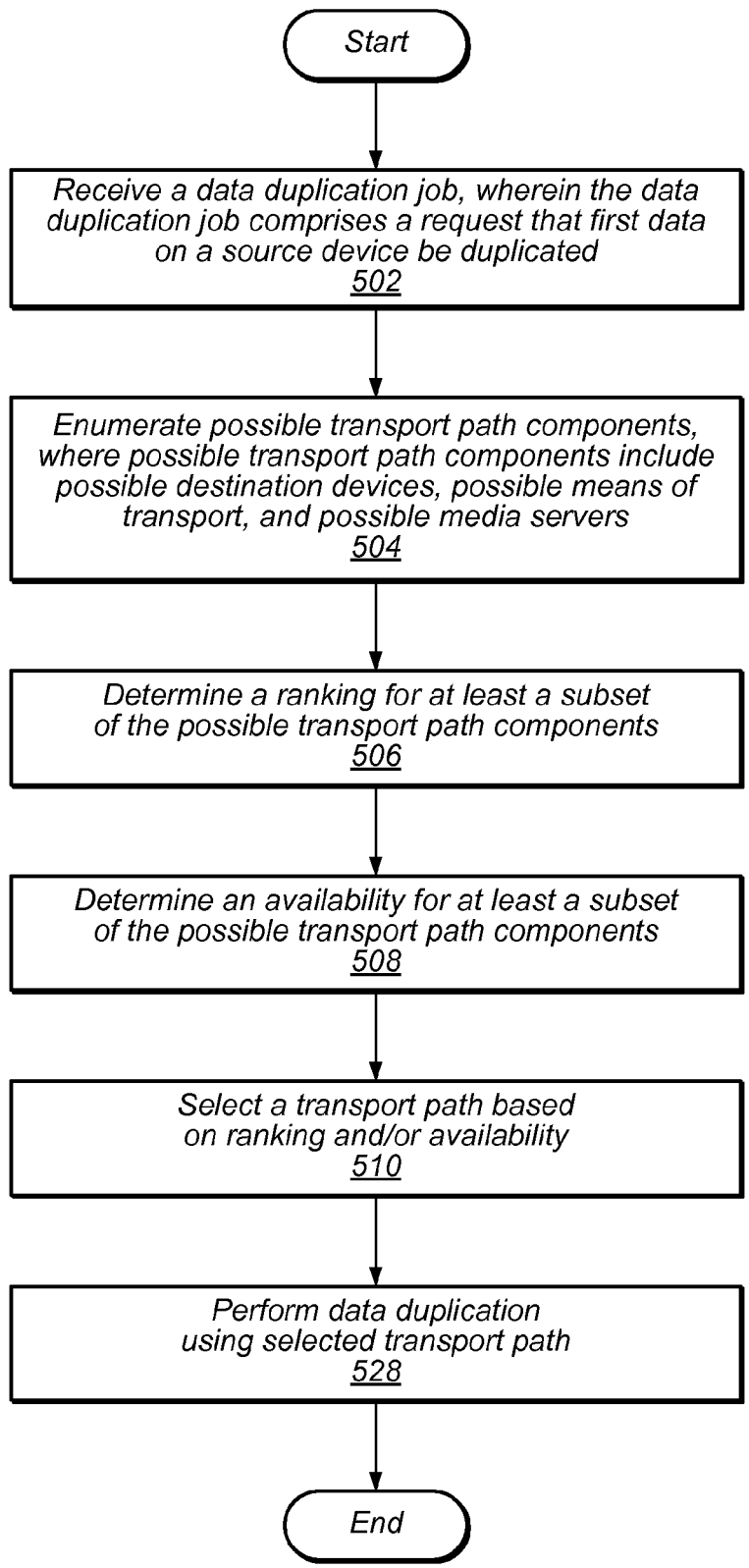
FIGS. 5-6 are flow diagrams illustrating embodiments of a method for automatically selecting a transport path for a data duplication job.

Turning now to FIG. 5, a method is disclosed for selecting a transport path for a data duplication job. The method may be implemented by a computer system (e.g., master server 190 shown in various of the previous Figures, or another computer system). The computer system may include, for example, one or more processors, and a computer readable storage medium which stores program instructions executable by the one or more processors to perform the method. The computer system may also include other hardware and/or components, for example, any of the hardware and components shown in and described with respect to FIG. 2. Another embodiment includes a computer readable storage medium (e.g., an article of manufacture) which stores program instructions executable to implement a method according to the embodiments described herein.

It should be noted that although the description below may set forth steps as being performed in a particular order, various of the steps may be performed in a different order, repeated, or omitted, as desired. One or more additional steps may also be performed, in some embodiments. The method may be performed as described below.

In 502, a data duplication job request may be received. The data duplication job request may be a request to create and store a duplicate image of a data image. The data duplication job may be created by a user, e.g., on one of the client computer systems 110, 120, or 130 shown in FIG. 1, or the data duplication job may be created on the master server 190 shown in FIG. 1, or on any suitable computer system. Alternatively, the data duplication job may be created automatically, e.g., as part of an automated backup system to ensure the security of data in a networked environment.

The data duplication job request may specify the data image to be duplicated, and according to various embodiments, may also include additional parameters or specifications for the data duplication job. For example, the data duplication job request may specify a source device on which the data image to be duplicated is located, a destination device to which the data image is to be duplicated, one or more transport path preferences and/or limitations (e.g., preferred/required types of components), whether or not the data duplication job may be queued under various circumstances, or other parameters or specifications.

In some embodiments, the data duplication job request may be received by a reception module (e.g., program instructions for receiving the data duplication job request, which may be executed by one or more processors), such as reception module 324 shown in FIG. 3, e.g., on master server 190.

In 504, possible transport path components may be enumerated. As shown in FIG. 4 and described above with respect thereto, in a complex networked environment there may be many possible transport paths, which may utilize various transport path components. According to some embodiments, there may be a database (e.g., database 320 shown in FIG. 3), stored on master server 190 or otherwise available to the system, in which various information is stored. In some embodiments, the database may include information on network topology and device capabilities, runtime states and loading factors of possible transport path components, and/or other information. Alternatively, there may be multiple databases, or other types of information storage, or some combination thereof, that store some or all of such information.

In some embodiments, an enumeration module (e.g., program instructions for enumerating possible transport path components, which may be executed by one or more processors), such as enumeration module 326 shown in FIG. 3, may use some or all of this information to enumerate a set of possible transport path components for the data duplication job. For example, based on the topological information about the networked environment, each possible destination device that could be used for the data duplication job, as well as any media servers or other components along any possible transport paths from the source device to those possible destination devices, and the means' of transport connecting each possible transport path component, may be enumerated.

In 506, a ranking may be determined for at least a subset of the possible transport path components. In some embodiments, this may be performed by a ranking module (e.g., program instructions for determining a ranking at least a subset of the possible transport path components, which may be executed by one or more processors), such as ranking module 328 shown in FIG. 3.

Some or all of the possible transport path components (e.g., the transport path components enumerated in step 504) may have differing capabilities, e.g., performance capabilities, connection bandwidth and/or number of connections possible, etc. In some embodiments, such information may be stored in database 320 shown in FIG. 3. These different capabilities may be used to rank some or all of the possible transport path components. Alternatively, or in addition, other factors may also be used to rank the possible transport path components, such as runtime loading of some or all of the possible transport path components. Thus, for example, a component which has lower inherent performance capabilities may have more available processing capability or bandwidth available than a higher performance component which is heavily loaded with traffic, and thus might perform better and correspondingly rank higher in some embodiments. On the other hand, in some embodiments even if a component is heavily loaded, if its inherent performance capabilities are sufficiently superior than a less heavily loaded component, it may still perform better and accordingly receive a higher ranking In other words, the rankings of the possible transport path components may be determined based on any number of factors, such as those described above, or other factors, according to various embodiments.

In some embodiments, it may be desirable to rank all of the possible transport path components. In other embodiments, it may be desirable to rank only a subset of the possible transport path components, or to initially rank only a subset of the possible transport path components, and rank additional components if it becomes desirable at a later time. For example, in some embodiments, the means of transport might have a larger impact on the transport efficiency of a possible transport path than the other types of transport path components. Thus, as one example, it may be possible to first rank the means' of transport, then only rank those possible transport path components that utilize the highest ranked means of transport. If, in subsequent steps, it were determined that the highest ranked means of transport is not available, in some embodiments rankings might be determined for an additional subset (up to or including the remainder) of the possible transport path components. It will also be noted that any number of variations as to ways of selecting a subset of the possible transport path components for which to determine rankings are also possible.

In 508, an availability may be determined for at least a subset of the possible transport path components. In some embodiments, this may be performed by an availability module (e.g., program instructions for determining an availability for at least a subset of the possible transport path components, which may be executed by one or more processors), such as availability module 330 shown in FIG. 3.

At any given time, a networked environment may have varying levels of traffic across the network(s). As noted above, different components may have different capabilities, e.g., including performance capabilities, bandwidth, number of connections, and so on. Some devices and means of transport may have limited availability; that is, they may only be used to transport some limited amount of data or number of jobs at a time. For example, in some embodiments, a tape device may be used by only one job at a time, while a fibre channel adapter may be used for some limited non-zero number of jobs, and a disk device may server some maximum number of jobs.

Thus, it may be important to determine the availability of at least a subset of the possible transport path components. For example, in some embodiments, the availability of the means of transport with the highest ranking determined in step 506, and the availability of some or all of the possible transport path components which could utilize that means of transport, may be determined first. In these embodiments, depending on whether there are sufficient possible transport path components which utilize the highest ranked means of transport available, availabilities of additional transport components (e.g., lower ranked means' of transport and components which utilize those means' of transport) may or may not also be determined. It will be noted that other embodiments, including different criteria for selecting a subset of the possible transport path components for which to determine availabilities, are also possible, and that in some embodiments, the availabilities of all of the possible transport path components may be determined.

In 510, a transport path may be selected. In some embodiments, this may be performed by a selection module (e.g., program instructions for selecting a transport path, which may be executed by one or more processors), such as selection module 322 shown in FIG. 3. In some embodiments, the selection module may take input (e.g., the received data duplication job request, the topological information, runtime performance and loading information, and/or other information) and use it to make a decision on a transport path for the data duplication job. In other words, the selection module may transform that input to create output data specifying the transport path. This output data may be stored (e.g. on a computer accessible storage medium) and/or utilized in a subsequent step, e.g., step 528 described below.

Figure 6:
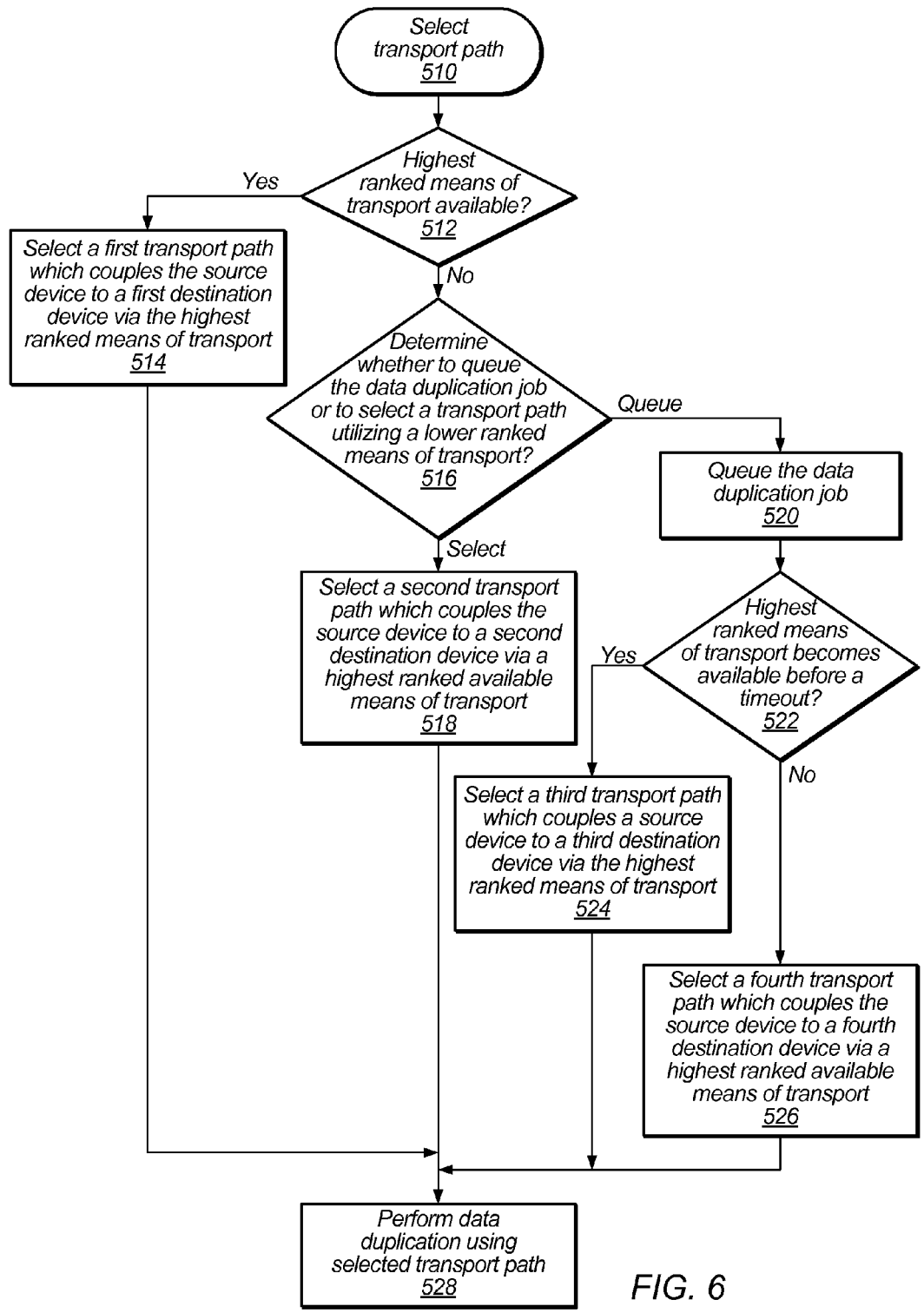

The chosen transport path may be selected based on the determined rankings and/or availabilities. The chosen transport path may also depend on one or more parameters or specifications of the data duplication job. Typically, the transport path selected may be used to efficiently perform the data duplication job, in a timely manner, while adhering to any parameters or specifications of the data duplication job. Any of various specific selection criteria or decisions may be used based on the determined rankings and/or availabilities, and in some cases parameters or specifications of the data duplication job. An exemplary decision flowchart illustrating one such possible decision sequence for selecting a transport path for the data duplication job is shown in FIG. 6 and described below with respect thereto. It will be noted, however, that the embodiments disclosed below with respect to FIG. 6 are exemplary only, and are not intended to be limiting.

In 528, the data duplication job may be performed using the selected transport path. Once the output of the selection module (e.g., which specifies a transport path for the data duplication job) has been produced, the data duplication job may be initiated based on that output. For example, in one embodiment, the master server 190 may initiate the data duplication job to run on the selected transport path. Thus, the data image to be duplicated may be copied from the source device on which it is located to a selected destination device via the selected transport path. For example, if the selected transport path utilized a fibre channel network (as does transport path 430 in FIG. 4), the data image to be duplicated might be read from the source device by a first selected media server, transported over the fibre channel network to a second selected second media server, and written to a destination device by the second selected media server. As will be apparent in light of this disclosure, other transport paths are also possible, such as transport paths 410 or 420 shown in FIG. 4, or any number of other transport paths.

FIG. 6 is a flowchart diagram illustrating a decision making process used to select a transport path according to one embodiment. In other words, FIG. 6 provides additional details as to the implementation of step 510 shown in FIG. 5, according to one set of embodiments. It will be recognized that the decision process shown in FIG. 6 is exemplary only, and that any number of implementations of step 510 may also be possible, including variations of the flow shown in FIG. 6, or altogether different transport path selection algorithms.

In 512, a decision may be made based on whether or not the highest ranked means of transport is available. As described above with respect to FIG. 5, the availabilities and rankings of various possible transport path components may have been determined in steps 504 and 506. If the highest ranked means of transport is available, then, the flow may proceed to step 514. If the highest ranked means of transport is not available, the flow may proceed to decision 516. It should be noted that in some embodiments, a means of transport may be considered unavailable either if the means of transport itself is unavailable, or if all devices that utilize the means of transport are unavailable, or both.

In 514, a first transport path may be selected. The first transport path may couple the source device to a first destination device via the highest ranked means of transport. If there is more than one possible transport path that would utilize the highest ranked means of transport, the highest ranked transport path components that utilize the highest ranked means of transport may be selected. Thus, for example, the first transport path might include the highest ranked destination device and media server(s) that couple to the source device via the highest ranked means of transport.

In 516, it may be determined whether to queue the data duplication job or to select a transport path that utilizes a lower ranked means of transport. Since the highest ranked means of transport may not be available, a decision may need to be made as to whether to perform the data duplication job on a lower ranked (and thus likely less efficient) transport path, or to wait a period of time, in which the highest ranked means of transport may become available. This may be performed by a queuing module (e.g., program instructions for determining whether to queue the data duplication job), such as queuing module 332 shown in FIG. 3.

One factor that may be considered in deciding whether to queue the data duplication job or to select a lower ranked transport path in some embodiments may include the parameters and/or specifications of the data duplication job itself. For example, in some embodiments, the data duplication job may be configured to specify on which means' of transport the data duplication job may be performed. For example, if the data duplication job explicitly requests the highest means of transport, and the highest means of transport is not available, the data duplication job may be queued. Other parameters and/or specifications of the data duplication job may also or alternatively be considered in deciding whether to queue the data duplication job.

In some embodiments, the nature of the data duplication job itself may be considered in whether to queue the data duplication job or to select a lower ranked transport path. For example, the size of the data set to be copied may influence which type(s) of transport may be acceptable. It may be more important to use a higher performance means of transport for larger data sets, while the type of transport may be less important for smaller data sets. In some embodiments, one or more configurable size thresholds may be used as part of determining whether to queue the data duplication job or to select a lower ranked transport path. Other characteristics of the data duplication job may also or alternatively be used in the deciding process.

In some embodiments, the loading of each means of transport at runtime may be considered in deciding whether to queue the data duplication job or to select a lower ranked transport path. For example, if the optimal means of transport is heavily loaded, but a less optimal means of transport is more lightly loaded, it may be acceptable to run a data duplication job on the lightly loaded but non-optimal means of transport.

If, based on some or all of these factors, it is determined to select a transport path utilizing a lower ranked mans of transport, the flow may proceed to step 518. If it is determined to queue the data duplication job, the flow may proceed to step 520.

In 518, a second transport path may be selected. The second transport path may couple the source device to a second destination device via a highest ranked available means of transport. In other words, as the highest ranked means of transport may not be available, the second transport path may utilize a less highly ranked means of transport, although the selected means of transport may still be the highest ranked means of transport available. The selection of the transport path components along the second transport path may otherwise be performed in a similar manner as described with respect to selection of the transport path components along the first transport path, e.g., in step 514. For example, if there is more than one possible transport path that would utilize the highest ranked available means of transport, the highest ranked transport path components that utilize the highest ranked available means of transport may be selected. Thus, for example, the second transport path might include the highest ranked destination device and media server(s) that couple to the source device via the highest ranked available means of transport.

In 520, the data duplication job may be queued. While the data duplication job is queued, a check may periodically (or continuously, if desired) be made as to whether the highest ranked means of transport has become available. Such checks may continue to be made periodically until the highest ranked means of transport does become available, or until a timeout is reached. This decision is shown as step 522.

If the highest ranked means of transport does become available before the timeout, the flow may proceed to step 524. In 524, a third transport path may be selected. The third transport path may couple the source device to a third destination device via the highest ranked means of transport. The third transport path may be selected in a similar manner as the first transport path. For example, if there is more than one possible transport path that would utilize the highest ranked means of transport, the highest ranked transport path components that utilize the highest ranked means of transport may be selected. Thus, for example, the third transport path might include the highest ranked destination device and media server(s) that couple to the source device via the highest ranked means of transport.

The third transport path (e.g., including the third destination device) may be the same transport path as the first transport path, however, it may alternatively be a different transport path. For example, as some time will pass if the data duplication job is in the queue, the runtime loading factors of the various possible transport path components along the highest ranked means of transport may change, and accordingly, may be re-ranked according to their updated loading conditions. Thus, given the possibility that the rankings may be different at the time at which step 524 would be performed than they would have been at the time at which step 514 would have been performed, the first and third transport paths may be the same or may be different.

If the highest ranked means of transport does not become available before the timeout, the flow may proceed to step 526. The timeout may be an amount of time that the job will remain in queue waiting for optimal transport before it will be allowed to run on sub-optimal transport. The amount of time may be any amount of time from 0 to infinite, and may be preconfigured or may be configurable, e.g., by an administrator, by a user or automated backup system that created the data duplication job, or some other entity.

In 526, a fourth transport path may be selected. The fourth transport path may couple the source device to a fourth destination device via the highest ranked available means of transport. The fourth transport path may be selected in a similar manner as the second transport path. For example, if there is more than one possible transport path that would utilize the highest ranked available means of transport, the highest ranked transport path components that utilize the highest ranked available means of transport may be selected. Thus, for example, the fourth transport path might include the highest ranked destination device and media server(s) that couple to the source device via the highest ranked available means of transport.

The fourth transport path (e.g., including the fourth destination device) may be the same transport path as the second transport path, however, it may alternatively be a different transport path. For example, as some time will pass if the data duplication job is in the queue, the runtime loading factors of the various possible transport path components along the highest ranked available means of transport (as well as the which means of transport is highest ranked) may change, and accordingly, may be re-ranked according to their updated loading conditions. Thus, given the possibility that the rankings may be different at the time at which step 526 would be performed than they would have been at the time at which step 518 would have been performed, the second and fourth transport paths may be the same or may be different.

Once a transport path has been selected (e.g., the first, second, third, or fourth transport path, according to the set of embodiments shown in FIG. 6 and described above with respect thereto), the data duplication job may be performed using the selected transport path in step 528, as described above with respect to FIG. 5.

* * *

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium comprising program instructions for selecting a transport path for a data duplication job, wherein the program instructions are executable by a computer system to:
   receive a data duplication job request, wherein the data duplication job request comprises a request that data stored on a source device be duplicated for backup;
   enumerate a plurality of possible transport path components, wherein the plurality of possible transport path components comprise two or more possible destination devices, one or more possible means of transport, and one or more possible media servers;
   determine a ranking for at least a subset of the possible transport path components;
   determine an availability for at least a subset of the possible transport path components;
   select a transport path based on the determined rankings and the determined availabilities, wherein the program instructions executable to select the transport path are executable to:
      select a first transport path that utilizes the highest ranked means of transport, in response to determining that a highest ranked means of transport is available; and
      put the data duplication job into a queue or select a second transport path, in response to determining that the highest ranked means of transport is not available;
   wherein the data duplication job is performed using the selected transport path.

2. The non-transitory computer-readable storage medium of claim 1, wherein said program instructions executable to select the transport path are executable to:
   determine that the highest ranked means of transport is not available;
   determine, based on characteristics of the data duplication job and runtime characteristics of the possible transport path components, whether to put the data duplication job into the queue or to select the second transport path.

3. The non-transitory computer-readable storage medium of claim 1, wherein said program instructions executable to select the transport path are executable to:
   determine that the highest ranked means of transport is not available;
   select the second transport path in response to determining that the highest ranked means of transport is not available, wherein the second transport path utilizes a highest ranked available means of transport.

4. The non-transitory computer-readable storage medium of claim 1, wherein said program instructions executable to select the transport path are executable to:
   determine that the highest ranked means of transport is not available;
   place the data duplication job into the queue in response to determining that the highest ranked means of transport is not available,
   periodically check whether the highest ranked means of transport is available;

if said periodically checking indicates that the highest ranked means of transport is available, select a first transport path that utilizes the highest ranked means of transport;

if the highest ranked means of transport is not available after a preconfigured amount of time has passed, select a second transport path that utilizes a highest ranked available means of transport.

5. The non-transitory computer-readable storage medium of claim 1, wherein the selected transport path comprises a selected destination device, a selected means of transport, and a selected one or more media servers, wherein the first destination device is coupled to the source device by the first means of transport and the first one or more media servers.

6. The non-transitory computer-readable storage medium of claim 1, wherein the ranking for each respective possible transport path component is based on the runtime loading and performance capability of the respective possible transport path component.

7. The non-transitory computer-readable storage medium of claim 1,
wherein the possible means of transport comprise one or more of:
shared memory transport;
device direct copy transport;
fibre channel transport;
LAN transport; or
WAN transport.

8. A method for selecting a transport path for a data duplication job, the method comprising:
using a computer to perform:
receiving a data duplication job request, wherein the data duplication job request comprises a request that data stored on a source device be duplicated for backup;
automatically enumerating a plurality of possible transport path components, wherein the plurality of possible transport path components comprise two or more possible destination devices, one or more possible means of transport, and one or more possible media servers;
automatically determining a ranking for at least a subset of the possible transport path components;
automatically determining an availability for at least a subset of the possible transport path components;
automatically selecting a transport path based on the determined rankings and the determined availabilities, comprising:
selecting a first transport path that utilizes the highest ranked means of transport, in response to determining that a highest ranked means of transport is available; and
putting the data duplication job into a queue or select a second transport path, in response to determining that the highest ranked means of transport is not available;
wherein the data duplication job is performed using the selected transport path.

9. The method of claim 8, wherein said automatically selecting the transport path comprises:
if the highest ranked means of transport is available:
automatically selecting a first transport path that utilizes the highest ranked means of transport;
if the highest ranked means of transport is not available:
automatically deciding, based on characteristics of the data duplication job and runtime characteristics of the possible transport path components, whether to put the data duplication job into the queue or to select the second transport path;
if it is decided to select the second transport path:
automatically selecting the second transport path, wherein the second transport path utilizes a highest ranked available means of transport.

10. The method of claim 9, further comprising, if it is decided to put the data duplication job into the queue:
putting the data duplication job into the queue;
periodically checking whether the highest ranked means of transport is available;
if said periodically checking indicates that the highest ranked means of transport is available, automatically selecting a third transport path that utilizes the highest ranked means of transport;
if the highest ranked means of transport is not available after a preconfigured amount of time has passed, automatically selecting a fourth transport path that utilizes a highest ranked available means of transport.

11. The method of claim 8, wherein the selected transport path comprises a selected destination device, a selected means of transport, and a selected one or more media servers, wherein the first destination device is coupled to the source device by the first means of transport and the first one or more media servers.

12. The method of claim 8, wherein the ranking for each respective possible transport path component is based on the runtime loading and performance capability of the respective possible transport path component.

13. The method of claim 8,
wherein the possible means of transport comprise one or more of:
shared memory transport;
device direct copy transport;
fibre channel transport;
LAN transport; or
WAN transport.

14. A computer system, comprising:
one or more processors;
a computer-readable storage medium coupled to the one or more processors, wherein the computer-readable storage medium comprises program instructions for selecting a transport path for a data duplication job, wherein the program instructions are executable by the one or more processors to:
receive a data duplication job request, wherein the data duplication job request comprises a request that data stored on a source device be duplicated for backup;
enumerate a plurality of possible transport path components, wherein the plurality of possible transport path components comprise two or more possible destination devices, one or more possible means of transport, and one or more possible media servers;
determine a ranking for at least a subset of the possible transport path components;
determine an availability for at least a subset of the possible transport path components;
select a transport path based on the determined rankings and the determined availabilities, wherein the program instructions executable to select the transport path are executable to:
select a first transport path that utilizes the highest ranked means of transport, in response to determining that a highest ranked means of transport is available; and put the data duplication job into a queue or select a second transport path, in response to determining that the highest ranked means of transport is not available;

wherein the data duplication job is performed using the selected transport path.

15. The computer system of claim 14, wherein said program instructions executable to select the transport path are executable to:

if a highest ranked means of transport is available:
select a first transport path that utilizes the highest ranked means of transport;

if the highest ranked means of transport is not available:
decide, based on characteristics of the data duplication job and runtime characteristics of the possible transport path components, whether to put the data duplication job into the queue or to select the second transport path;

if it is decided to select the second transport path:
select the second transport path, wherein the second transport path utilizes a highest ranked available means of transport.

16. The computer system of claim 15, wherein said program instructions are further executable to, if it is decided to put the data duplication job into the queue:

put the data duplication job into the queue;
periodically check whether the highest ranked means of transport is available;
if said periodically checking indicates that the highest ranked means of transport is available, select a third transport path that utilizes the highest ranked means of transport;
if the highest ranked means of transport is not available after a preconfigured amount of time has passed, select a fourth transport path that utilizes a highest ranked available means of transport.

17. The computer system of claim 14, wherein the selected transport path comprises a selected destination device, a selected means of transport, and a selected one or more media servers, wherein the first destination device is coupled to the source device by the first means of transport and the first one or more media servers.

18. The computer system of claim 14, wherein the ranking for each respective possible transport path component is based on the runtime loading and performance capability of the respective possible transport path component.

19. The computer system of claim 14,
wherein the possible means of transport comprise one or more of:
shared memory transport;
device direct copy transport;
fibre channel transport;
LAN transport; or
WAN transport.

* * * * *